Figure 1:
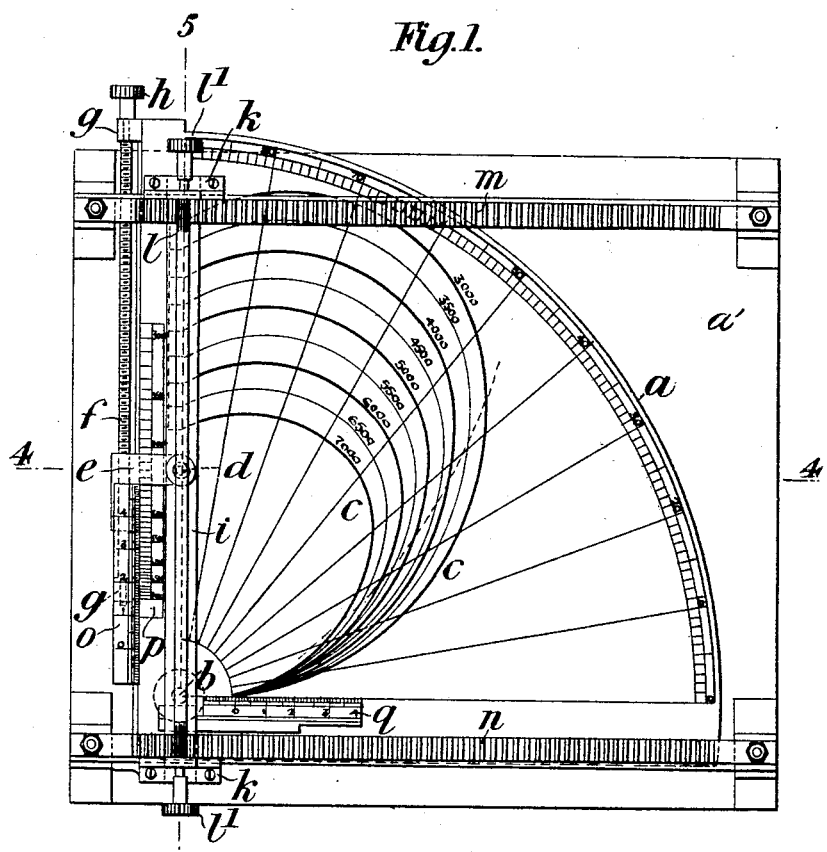

S. B. RALSTON.
INSTRUMENT FOR INDICATING THE RIGHTING ARMS AND OTHER PARTICULARS RELATING TO THE STABILITY OF SHIPS.
APPLICATION FILED MAY 21, 1914.

1,116,119.

Patented Nov. 3, 1914.

2 SHEETS—SHEET 1.

WITNESSES.
J. K. Moore
Robt. E. Barry

INVENTOR
Shirley B. Ralston
By Whitaker & Prevost
Attys.

S. B. RALSTON.
INSTRUMENT FOR INDICATING THE RIGHTING ARMS AND OTHER PARTICULARS RELATING TO THE STABILITY OF SHIPS.
APPLICATION FILED MAY 21, 1914.

1,116,119.

Patented Nov. 3, 1914.

2 SHEETS—SHEET 2.

UNITED STATES PATENT OFFICE.

SHIRLEY BROOKS RALSTON, OF GLASGOW, SCOTLAND.

INSTRUMENT FOR INDICATING THE RIGHTING-ARMS AND OTHER PARTICULARS RELATING TO THE STABILITY OF SHIPS.

1,116,119.  Specification of Letters Patent.  Patented Nov. 3, 1914.

Application filed May 21, 1914.  Serial No. 840,037.

*To all whom it may concern:*

Be it known that I, SHIRLEY BROOKS RALSTON, a subject of the King of Great Britain, residing at Sandhurst, Balmore, by Torrance, Glasgow, Scotland, have invented a new and useful Instrument for Indicating the Righting-Arms and other Particulars Relating to the Stability of Ships, of which the following is a specification.

This invention relates to an instrument by means of which the righting arms or levers and other information, contained for a limited number of conditions of loading of a ship in the diagram known as "curves of statical stability", can be read off with facility and without calculation for any condition of loading, or in other words, for any metacentric height, or G. M. and any displacement.

To this end according to my invention I construct an instrument comprising a plan of curves plotted to indicate for various displacements the horizontal distances usually known as B. R. between the center of buoyancy of a vessel in the upright position and the center of buoyancy at different inclinations or angles of heel. This plan of curves is provided with a pin or the equivalent, the position of which indicates that of the center of gravity of the vessel and which can be adjusted to conform to variations of that center at any displacement as indicated by variations in the metacentric height or G. M. The pin or the equivalent has arranged in conjunction with it a bar or other equivalent device which coincides with the vertical or middle line through the axis when in the normal position. Means are also provided whereby a relative movement may be caused to take place between the plan of curves and the middle line such that the said bar or the equivalent at all times represents a vertical drawn through the center of gravity of the ship. The bar is furnished with a horizontal scale whereby the length of the righting arm or the horizontal distance between the center of gravity and the center of buoyancy usually known as G. Z. can be read off on the curve corresponding to any given displacement and for any particular degree of inclination of the ship.

To enable my invention to be fully understood, I will describe it by reference to the accompanying drawings, in which:—

Figure 2:
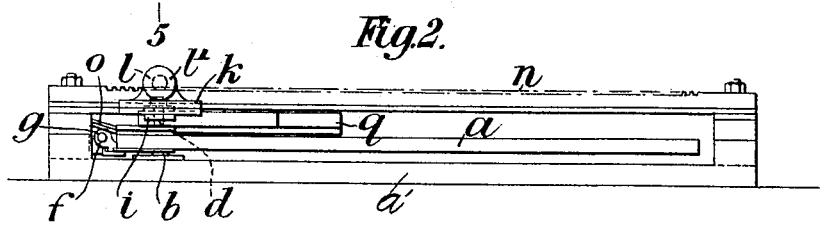
Figure 3:
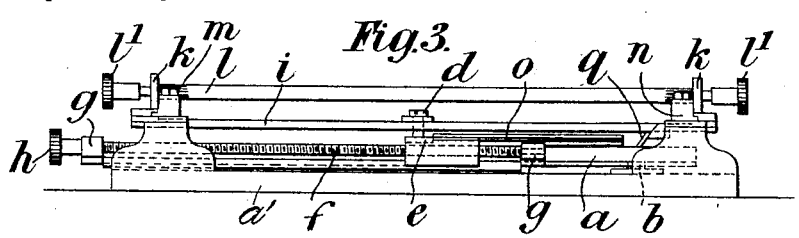
Figure 4:
Figure 5:
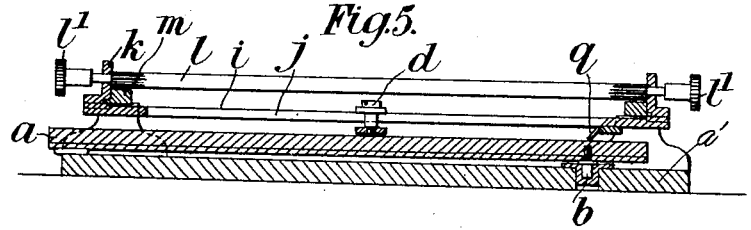
Figure 6:
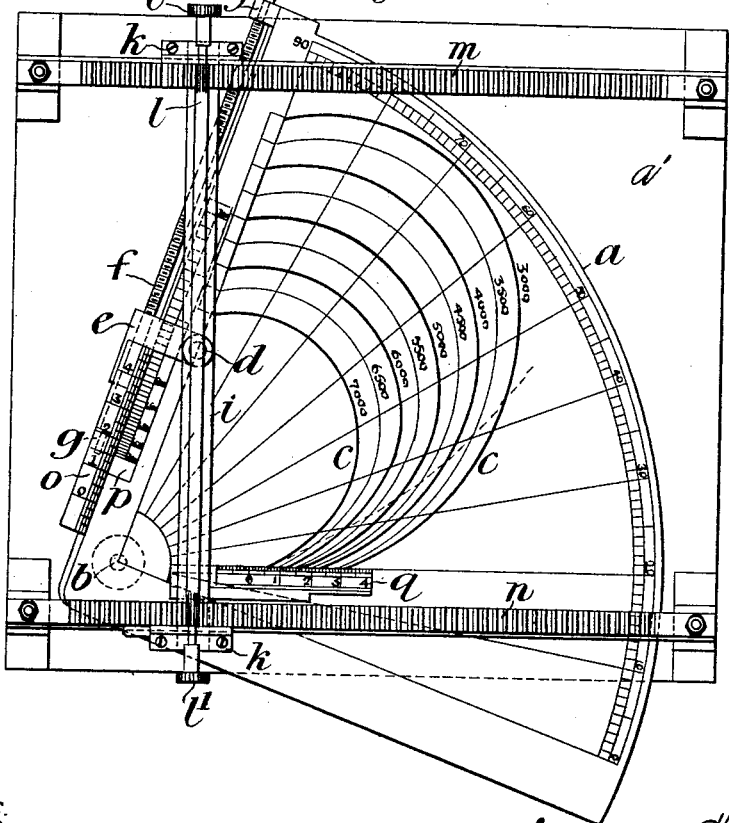

Figure 1 is a plan of one form of instrument embodying the invention. Fig. 2 is a front view thereof. Fig. 3 is a side view. Fig. 4 is a section on the line 4—4, Fig. 1. Fig. 5 is a section on the line 5—5, Fig. 1, and Fig. 6 is a view similar to Fig. 1, but showing the parts in a different position.

$a$ is the plan of curves which in the instrument illustrated is in the form of a quadrant which is pivotally mounted at $b$ on a supporting base member $a'$. The quadrant is graduated in degrees and carries a series of curves $c$ which indicate for various displacements the horizontal distances or B. R. between the center of buoyancy of a vessel in the upright position, and the center of buoyancy at the different inclinations or angles of heel denoted by the graduations on the quadrant.

$d$ is the pin which is provided upon the quadrant $a$ and which is designed to represent the position of the center of gravity of a vessel. This pin $d$ is carried by a bracket $e$ which engages with a screw $f$ rotatably mounted in bearings $g$ upon the quadrant, so that it can be turned by the milled head $h$, but cannot move axially relatively to the said quadrant. As will be obvious, therefore, the rotation of the screw adjusts the position of the pin $d$ relatively to the plan of curves upon the quadrant $a$.

$i$ is the bar which is designed to represent the vertical or middle line through the axis when in the normal position, this bar $i$ being formed with a longitudinal slot $j$ with which engages the aforementioned pin $d$. The said bar $i$ is provided with brackets $k$ in bearings in which is rotatably mounted the pinion rod $l$ which gears with two racks $m$ and $n$ rigidly mounted on the base $a'$ parallel to one another and to the lower side of the quadrant or plan of curves when the latter is in the normal position, shown in Fig. 1, in which position the other side of the quadrant is at right angles to the said racks and parallel to the bar $i$. As will be obvious by turning the pinion rod $l$ by either of the milled heads $l^1$ it is caused to move along the racks $m$, $n$ carrying with it the slotted bar $i$. The position of the pin $d$ in the slotted bar $i$ can be measured by means of two scales $o$ and $p$, the former of which is attached to the bracket $e$ carrying the pin $d$ and with which it moves, and the latter of which is marked upon, or carried by, the side of the quadrant $a$ adjacent to the first scale $o$. The scale $o$ is divided into feet and inches and indicates the G. M. or metacentric height, or the distance of the C. G. from the metacenter. The scale $p$ is divided in terms of the displacement and represents the heights for varying displacements of the metacenter above the C. B. or the center of buoyancy in the upright position of the ship. The two scales combined, therefore, show the height of the C. G. above the C. B. To set the scales $o$ and $p$ the pin $d$ is adjusted so that its distance from the pivot $b$ corresonds to the distance between the center of gravity and the center of buoyancy of the vessel in the light condition and the scale $p$ is then adjusted so as to bring the G. M. of the vessel in the light condition and shown on the scale $o$ into coincidence with the indication of the light weight of the vessel given on the scale $p$; the said scale $p$ is then secured to the quadrant $a$.

$q$ is the horizontal scale which is secured to the bar $i$ and which is graduated so as to indicate the length of the righting arm or the horizontal distance between the center of gravity and the center of buoyancy and usually known as G. Z. This scale is set by placing its zero mark against the common origin of the curves $c$.

The instrument is employed as follows:—The pin $d$ is adjusted by means of the two scales $o$ and $p$ so as to represent the particular height of the C. G. dealt with. For example, suppose that the G. M. is four feet and the displacement five thousand tons, then the screw $f$ is turned so as to bring the four foot graduation on the scale $o$, into coincidence with the five thousand graduation on the scale $p$, as shown in Fig. 1. The pinion rod $l$ is then turned so as to cause it to advance along the racks $m$, this movement also causing the quadrant $a$ to turn upon its pivot so as to represent different angles of heel of a vessel. This relative movement of the parts is shown in Fig. 6, in which the screw $f$ has been turned so as to bring the quadrant into such a position that the line indicating 20° of heel is in coincidence with the upper face of the horizontal scale $q$. As will be evident the bar $i$ moves along the racks $m$, $n$ parallel to its initial position and consequently represents a perpendicular drop from the C. G. to the horizontal line or B. R. corresponding to the displacement and angle of heel dealt with. The horizontal scale $q$ which is attached to the bar then indicates on the particular displacement curve $c$, in this case the five thousand curve, the horizontal distance in feet of the C. G. from the inclined C. B. or in other words the G. Z. or righting arm.

It will be understood that the embodiment of the invention which is above particularly described and illustrated in the drawings is given as an example only of the practical application of the invention, the principle of which can be applied in other ways.

Claims:

1. An instrument for indicating the righting arms and other particulars relating to the stability of ships, comprising a supporting base member, a plan of curves plotted to indicate the B. R. for various displacements of a vessel pivotally mounted on said base member, a pin the position of which indicates the center of gravity of a vessel and which can be adjusted in position relatively to the plan of curves, and a bar for use in conjunction with the pin and means whereby relative movement may be effected between the plan of curves and the bar such that the latter at all times represents a vertical drawn through the center of gravity of the ship, substantially as, and for the purpose, hereinbefore described.

2. An instrument for indicating the righting arms and other particulars relating to the stability of ships, comprising a supporting base member, a plan of curves in the form of a graduated quadrant pivotally mounted on said base member, a pin adjustably mounted on the said quadrant, a slotted bar with which the said pin engages, and means for causing the bar to move in a direction parallel with the lower edge of said quadrant when said quadrant is in normal position.

3. An instrument for indicating the righting arms and other particulars relating to the stability of ships, comprising a supporting base member, a plan of curves plotted to indicate the B. R. for various displacements of a vessel pivotally mounted on said base member, means for indicating the center of gravity of the vessel, means for representing a vertical drawn through the center of gravity of the ship, and connecting means whereby relative movement may be effected between the plan of curves and the means for representing the vertical drawn through the center of gravity.

4. An instrument for indicating the righting arms and other particulars relating to the stability of ships, comprising a supporting base member, a plan of curves plotted to indicate the B. R. for various displacements of a vessel pivotally mounted on said base member, means for indicating the center of gravity of the vessel, means for adjusting the center of gravity means relatively to the plan of curves, means for representing a vertical drawn through the center of gravity of the ship, and connecting means, whereby relative movement may be effected between the plan of curves and the means for representing the vertical drawn through the center of gravity.

5. An instrument for indicating the righting arms and other particulars relating to the stability of ships, comprising a supporting base member, a plan of curves in the form of a graduated quadrant pivotally mounted on said base member, a pin adjustably mounted on said quadrant, a scale provided upon said quadrant and divided in terms of displacement to represent the heights for varying displacements of the metacenter above the C. B. in the upright position of the ship, a scale mounted adjacent said pin and movable therewith, said last named scale being divided into feet and inches to indicate the G. M., a slotted bar with which the pin engages, and means for causing the bar to move in a direction parallel with the lower edge of said quadrant when said quadrant is in normal position.

6. An instrument for indicating the righting arms and other particulars relating to the stability of ships, comprising a supporting base member, a plan of curves in the form of a graduated quadrant pivotally mounted on said base member, a displacement scale provided along one edge of said quadrant, bearings provided on said quadrant, a screw mounted in said bearings, a bracket provided on said screw, a pin provided on said bracket, a linear scale also provided on said bracket, racks provided upon said base member and extending parallel to the lower edge of said quadrant when in its normal position, a slotted bar mounted for movement along said racks, said pin engaging said slot, and a horizontal scale provided upon said bar and graduated so as to indicate the length of the righting arm.

SHIRLEY BROOKS RALSTON.

Witnesses:
ROBERT G. FRAZER,
JNO. W. BLAKSTON.

Copies of this patent may be obtained for five cents each, by addressing the "Commissioner of Patents, Washington, D. C."